United States Patent [19]

Kitamura

[11] Patent Number: 5,045,580

[45] Date of Patent: Sep. 3, 1991

[54] ANTISTATIC THERMOPLASTIC POLYESTER RESIN COMPOSITION

[75] Inventor: Hiroshi Kitamura, Shizuoka, Japan

[73] Assignee: Polyplastics Co., Ltd., Osaka, Japan

[21] Appl. No.: 443,135

[22] Filed: Nov. 30, 1989

[30] Foreign Application Priority Data

Dec. 2, 1988 [JP] Japan ................... 63-305515

[51] Int. Cl.$^5$ .................................. C08K 5/524
[52] U.S. Cl. ....................... 524/147; 524/153; 524/161; 524/166; 524/238; 524/239; 524/320
[58] Field of Search ............ 524/912, 320, 239, 151, 524/153, 161, 166, 238, 147

[56] References Cited

U.S. PATENT DOCUMENTS

| | | | |
|---|---|---|---|
| 2,437,046 | 3/1948 | Rothrock | 524/153 |
| 3,255,151 | 6/1966 | Hecker et al. | 524/151 |
| 3,476,698 | 11/1969 | Osterrieth et al. | 524/166 |
| 3,560,591 | 2/1971 | Tanaka et al. | 524/161 |
| 3,583,941 | 6/1971 | Trapasso et al. | 524/166 |
| 3,663,498 | 5/1972 | Hofheim et al. | 524/161 |
| 3,904,578 | 9/1975 | Kawase et al. | 524/604 |
| 4,713,408 | 12/1987 | Takahashi et al. | 524/166 |
| 4,882,375 | 11/1989 | Tyrell et al. | 524/161 |

FOREIGN PATENT DOCUMENTS 53-149245 12/1978 Japan .

Primary Examiner—Veronica P. Hoke
Attorney, Agent, or Firm—Nixon & Vanderhye

[57] ABSTRACT

A thermoplastic polyester resin composition exhibiting improved antistatic properties including a thermoplastic polyester resin, between about 0.02 to about 10 wt. %, based on the total weight of the composition, of a sulfonate-type anionic antistatic agent, and between about 0.005 to about 10 wt. %, based on the total weight of the composition, of one or more compounds selected from organophosphorus compounds, and organic chelating agents.

6 Claims, No Drawings

ANTISTATIC THERMOPLASTIC POLYESTER RESIN COMPOSITION

FIELD OF THE INVENTION

The present invention relates to thermoplastic polyester resin compositions which may be employed in end-use applications requiring antistatic properties, such as parts of precision instruments and electronic and electric appliances. In particular, the present invention relates to thermoplastic polyester resin compositions having excellent antistatic properties and high resistance to thermal decomposition.

BACKGROUND AND SUMMARY OF THE INVENTION

Thermoplastic polyester resins are conventionally and widely used as an engineering resin due to the well-balanced mechanical and physical properties that such resins exhibit. For example, polyester resins have been used as a material to form parts of precision instruments and electronic and electric components. The incorporation of an antistatic agent in such parts is usually indispensable so as to prevent dust accumulation which might deleteriously affect the part's performance characteristics and/or reliability.

Antistatic agents that have conventionally been used for thermoplastic polyester resins include sulfonate-type anionic antistatic agents, particularly metal alkyl-sulfonates and metal alkyl-aromatic sulfonates.

However, thermoplastic polyester resins containing such conventional sulfonate-type anionic antistatic agents are problematic in that they tend to decompose during extrusion or molding operations and thereby impair the melt stability of the resins to an extent that the resins are discolored and/or their properties decrease. Furthermore, the presence of such conventional anti-static agents can cause the polyester resins to "bubble" during kneading and extrusion so as to reduce the resins' bulk density. Thus, when strands of the resins are cooled with water during pelletizing, the water tends to be adsorbed into the bubbles and thereby prolong the drying time that is required. Thus, productivity is reduced.

One object of the present invention is to provide a thermoplastic polyester resin composition having thermal decomposition resistance and excellent antistatic properties. Broadly, therefore, the present invention is directed to an anti-static polyester resin which includes a combination of a sulfonate-type anionic antistatic agent and an organophosphorus compound, and/or an organic chelating agent.

DETAILED DESCRIPTION OF THE PREFERRED EMBODIMENTS

The present invention more specifically relates to a thermoplastic polyester resin composition comprising:
(A) a thermoplastic polyester resin,
(B) between about 0.02 to about 10 wt. %, based on the total amount of the composition, of a sulfonate-type anionic antistatic agent, and
(C) between about 0.005 to about 10 wt. %, based on the total amount of the composition, of one or more compounds selected from (C₁) organophosphorus compounds and (C₂) organic chelating agents.

The thermoplastic polyester resin component (A) usable in the present invention is produced by polycondensation of a dicarboxylic acid compound with a dihydroxy compound, polycondensation of a hydroxy carboxylic acid compound or polycondensation of these three compounds. The effect of the present invention can, moreover, be obtained with any homopolyester or copolyester.

The dicarboxylic acid compounds usable herein include, for example, known dicarboxylic acids such as terephthalic, isophthalic, naphthalenedicarboxylic, diphenyldicarboxylic, diphenyl ether dicarboxylic, diphenylethanedicarboxylic, cyclohexanedicarboxylic, adipic and sebacic acids as well as those substituted with an alkyl, alkoxy or halogen. Further the dicarboxylic acid compounds are usable in the form of an ester-forming derivative thereof, such as a lower alcohol ester, e.g. dimethyl ester. These compounds are used either singly or in combination of two or more.

The dihydroxy compounds included, for example, ethylene glycol, propylene glycol, butanediol, neopentyl glycol, butenediol, hydroquinone, resorcinol, dihydroxydiphenyl ether, cyclohexanediol and 2,2-bis(4-hydroxydiphenyl)propane. Also polyoxyalkylene glycols and those substituted with an alkyl, alkoxy or halogen are usable. These compounds are used either singly or in the form of a mixture of two or more.

The hydroxy carboxylic acids include, for example, hydroxybenzoic, hydroxynaphthoic and diphenyleneoxycarboxylic acids as well as those substituted with an alkyl, alkoxy or halogen. Also ester-forming derivatives of these compounds are usable. These compounds are used either singly or in combination of two or more of them in the present invention.

All the thermoplastic polyesters formed by the polycondensation using the above-described compounds as monomers can be employed in the present invention, and can be used either singly or in the form of a mixture of two or more. Polyester resins which can be processed at about 200 to 300° C. are preferably used in the present invention since the decomposition of the resin by the sulfonate-type anionic antistatic agent (B) is accelerated as the temperature is elevated. This decomposition cannot be inhibited completely even with the presence of organophosphorus compound or the organic chelating agent. Therefore, preferred base resins are polyalkylene terephthalates and their copolymers, particularly those mainly comprising polybutylene terephthalate or its copolymer. Particularly beneficial effects of the present invention can be obtained with such polyesters. The compositions of this invention comprise between about 80 to about 99.975 wt % of a thermoplastic polyester resin.

The sulfonate-type anionic antistatic agent (B) used in the present invention includes, for example, metal alkyl-sulfonates and metal alkyl-aromatic sulfonates. The metal alkylsulfonates include, for example, alkali metal or alkaline earth metal aliphatic sulfonates in which the alkyl group has 1 to 35 carbon atoms, preferably 8 to 22 carbon atoms. The alkali metals include, for example, sodium and potassium and the alkaline earth metals include, for example, calcium, barium and magnesium.

Specific examples of metal alkylsulfonates include sodium n-hexylsulfonate, sodium n-heptylsulfonate, sodium n-octylsulfonate, sodium n-nonylsulfonate, sodium n-decylsulfonate, sodium n-dodecylsulfonate, sodium n-tetradecylsulfonate, sodium n-hexadecylsulfonate, sodium n-heptadecylsulfonate and sodium n-octadecylsulfoante.

Specific examples of metal alkyl-aromatic sulfonates include alkali metal or alkaline earth metal salts of sulfonic acids comprising 1 to 3 aromatic nuclei substituted with an alkyl group having 1 to 35, preferably 8 to 22, carbon atoms.

The alkali metals include, for example, sodium and potassium and the alkaline earth metals includes, for example, calcium, barium and magnesium.

The aromatic sulfonic acids include, for example, benzenesulfonic, naphthalene-1-sulfonic, naphthalene-2,6-disulfonic, diphenyl-4-sulfonic and diphenyl ether 4-sulfonic acids.

Metal alkyl-aromatic sulfonates include, for example, sodium hexylbenzenesulfonate, sodium nonylbenzenesulfonate and sodium dodecylbenzenesulfonate.

The sulfonate-type anionic antistatic agents can be used either singly or in the form of a mixture of two or more. When an insufficient amount of the antistatic agent is used, unsatisfactory antistatic effects are obtained. On the other hand, when the amount of antistatic agent is excessive, the thermal stability of the resin is seriously impaired. The amount of antistatic agent employed according to the present invention is therefore between about 0.02 to about 10 wt. %, and preferably between about 0.2 to about 5 wt. %, based on the total weight of the composition.

The present invention is characterized in that one or more compounds selected from organophosphorus compounds ($C_1$) and organic chelating agents ($C_2$) are used as the component (C) in order to control the undesirable effects of the sulfonate-type anionic antistatic agent on the polyester resin, such as resin decomposition acceleration (which impairs various properties of the resin), resin "bubbling" (caused by the release of the decomposition gas), and resin discoloration.

The organophosphorus compounds ($C_1$) usable in the present invention include known compounds, such as, phosphoric esters, phosphorus esters and phosphonites, among which those containing a trivalent phosphorus atom are preferred. The phosphorus esters such as triaryl phosphites, trialkyl phosphites and trialkylaryl phosphites are particularly preferred.

Specific examples include triphenyl phosphite, tridecyl phosphite, diphenyl mono (2-ethylhexyl) phosphite, diphenyl isodecyl phosphite, phenyl diisodecyl phosphite and tris(nonylphenyl) phosphite.

The organic chelating agents ($C_2$) which may be used in the present invention are compounds having a polydentate ligand capable of combining with the metal ion to form a chelate compound. They include, for example, polyamino carboxylic acids, hydroxy carboxylic acids and condensed phosphoric salts.

Specific examples include ethylenediaminetetraacetic acid, cyclohexanediaminetetraacetic acid, ethylenediaminediacetic nitrilotriacetic acid, hydroxyethylethylenediaminetriacetic acid, diethylenetriaminepentaacetic acid triethylenetetraminehexaacetic acid and hydroxyethyliminodiacetic acid, dihydroxyethylglycine, gluconic acid, tartaric acid and citric acid.

One or more compounds selected from the organophosphorus compounds ($C_1$) and organic chelating agents ($C_2$) are used as the component (C) in the present invention. The amount of the component (C) is preferably between about 0.005 to about 10 wt. %, based on the total weight of the composition. When the amount of component (C) is less than 0.005 wt. %, the adverse effect of the sulfonate-type anionic antistatic agent (B) on the polyester resin is minimally inhibited and, therefore the problems mentioned previously, such as property degradation, bubbling, or discoloration occur. On the contrary, when the amount of component (C) exceeds 10 wt. %, property impairment or discoloration caused by the component (C) occur. The preferred amount of the component (C) is between about 0.05 to about 5 wt. %.

The weight ratio of the component (C) to the antistatic agent (B) is preferably 3/100 to 100/100, particularly 5/100 to 50/100.

When the organophosphorus compound ($C_1$) and/or the organic chelating agent ($C_2$) is incorporated in the thermoplastic polyester resin, the decomposition, bubbling, discoloration, etc. of the resin by the anionic antistatic agent at high temperature can be inhibited. Thus, impairment of the mechanical properties and various other properties due to the deterioration due to heating/melting during extrusion molding can be inhibited.

The composition according to this invention comprising (A) the thermoplastic polyester resin, (B) the sulfonate-type anionic antistatic agent and (C) the organophosphorus compound ($C_1$) and/or organic chelating agent ($C_2$) as indispensable components exhibits excellent antistatic, thermal stability and moldability properties. Since, however, excellent flame retardancy, mechanical properties, thermal resistance, dimensional stability (resistance to deformation and warpage) are required of thermoplastic polyester resin in many cases depending on its end use, it is often preferred to also incorporate a flame retardant and/or an organic filter.

The flame retardant usable for the above-described purpose may be any flame retardant ordinarily used for the thermoplastic polyester resins. Usually an organohalogen compound is used, particularly aromatic bromine compounds. Such compounds include, for example, low molecular weight bromine compounds such as penta- to decabrominated diphenyl ether; brominated aromatic carbonates derived from bisphenol A; brominated monomeric epoxy compounds and polymers thereof; brominated polystyrene oligomers; and brominated cyanuric esters.

The flame retardants can be used either singly or in the form of a mixture of two or more. The amount of the flame retardant is preferably as small as possible, since when large amounts are used, the mechanical properties of the composition are impaired. The flame retardant is usually used in amounts between 0 to 25 wt. %, particularly between 2 to 20 wt. %, based on the total weight of the composition. The flame retardant is preferably used in combination with a flame retardant assistant in the present invention.

The flame retardant assistants usable herein include metal oxides and hydroxides such as antimony trioxide, antimony halides, aluminum hydroxide and magnesium hydroxide. The amount of the flame retardant assistant is preferably between 0 to 15 wt. %, and some preferably between 1 to 10 wt. % based on the total weight of the composition.

The inorganic fillers may be fibrous, powdery, granular and platy fillers which can be selected depending on the end use of the resin composition.

Examples of fibrous fillers include inorganic fibrous fillers such as fibers of glass, asbestos, carbon, silica, silica/alumina, zirconia, boron nitride, silicon nitride, boron and potassium titanate, and those of metals such as stainless steel, aluminum, titanium, copper and brass. Typical fibrous fillers are glass and carbon fibers. Further high-melting organic fibrous materials such as polyamide, fluororesins and acrylic resins are usable like the inorganic fibrous fillers described previously.

The powdery or granular fillers include, for example, carbon black; silica; quartz powder; glass beads; glass powder; silicates such as calcium silicate, aluminum silicate, caolin, talc, clay, diatomaceous earth and wollastonite; metal oxides such as iron oxides, titanium oxides, zinc oxides and alumina, metal carbonates such as calcium carbonate and magnesium carbonate; metal sulfates such as calcium sulfate and barium sulfate; silicon carbide; silicon nitride; boron nitride; and metal powders. The platy fillers include, for example, mica, glass flakes and various metal foils.

The inorganic fillers can be used either singly or in combination of two or more of them. A combination of the fibrous filler, particularly glass or carbon fibers, with a granular and/or platy filler is preferred from the viewpoints of the resulting mechanical strength, dimensional accuracy and electrical properties of the resin composition.

It is desirable to use the filler in combination with a sizing agent or a surface-treating agent, if necessary. They include functional compounds such as epoxy, isocyanate, silane and titanate compounds. These sizing agents are used for the preliminary surface treatment of sizing treatment or are added to the starting materials during their production.

The amount of the inorganic filler used is preferably between about 0 to about 65 wt. %, and may suitably be determined within this range depending on the one-use of the resin or the additive types employed For example, when the mechanical strength (particularly rigidity or the like) is to be improved, the inorganic filler is preferably used in an amount of between 5 to 65 wt. %, particularly, between 10 to 60 wt. %. When the inorganic filler is used in insufficient amounts, the mechanical strength is poor. On the contrary, when it is excessive, the molding operation becomes difficult and the mechanical strength of the moldings is unsatisfactory.

It is also preferred in the present invention to add a polyolefin wax to the composition in order to improve the moldability or releasability. In particular, an oxidized polyolefin wax, i.e. a modified polyolefin wax produced by thermally decomposing a polyolefin in an oxidizing atmosphere or by introducing a polar group of, for example, a carboxylic acid thereinto in the polymerization step is preferred, since it is effective in controlling an adverse effect of the sulfonate-type anionic antistatic agent (component B) on the polyester resin in addition to the above-described effect.

Examples of suitable polyolefin waxes include modified polyethylene, modified propylene and those produced by modifying ethylene copolymers such as ethylene/propylene, ethylene/vinyl acetate, ethylene/acrylic ester and ethylene/acrylic acid copolymers in the above-described manner. Among them, the modified (oxidized) polyethylene wax is particularly preferred.

The amount of the modified (oxidized) polyolefin wax is preferably 3 to 200 parts by weight, particularly 5 to 60 parts by weight, per 100 parts by weight of the antistatic agent.

The composition of the present invention can also comprise a small amount of other auxiliary thermoplastic resins in addition to the above-described components depending on the use thereof. Specific examples include polyethylene, ethylene copolymers such as ethylene/vinyl acetate copolymer and ethylene/alkyl acrylate copolymers, polypropylene, polyurethane, polyamide, polycarbonate, polyphenylene sulfide, polyphenylene oxide, polyacetal, polysulfone, polyether sufone, polyether imide, polyether ketone and fluororesin. These thermoplastic resins can be used either singly or in the form of a mixture of two or more.

The composition of the present invention may further contain known substances usually added to thermoplastic and thermosetting resins, such as stabilizers, e.g., antioxidants and ultraviolet absorbers, flame retardants, colorants, e.g. dyes and pigments, lubricants, crystallization accelerators and nucleating agents depending on the performance required of the composition.

The polyester resin composition of the present invention can be produced by processes and with apparatus usually employed and used for the production of synthetic resin compositions. In particular, the necessary components are mixed together, and the mixture is kneaded and extruded with a single- or double-screw extruder to form pellets. Part of the necessary components are mixed to form a master batch to be used in the molding step. In another process, part or the whole of the resin components are pulverized and mixed together and the mixture is then melted and extruded.

The polyester resin compositions of the present invention exhibit excellent antistatic properties and improved resistance to thermal decomposition. Furthermore, its mechanical properties are not impaired during extrusion or molding processes. And, it undergoes neither bubbling nor discoloration in the course of the production. Therefore, the resin compositions of this invention do not have those free from problems caused by bubbling or discoloration. The compositions can, moreover, be molded with a hot runner (which usually causes severe thermal hysteresis in conventional resins). Thus, the molding process can be conducted in an economically advantageous manner. Further, since the moldings have excellent antistatic properties, they are free from electrostatic adsorption of dust and also do not exhibit decreased mechanical properties and the like which is typically associated with antistatic agents. Thus, the compositions of this invention are quite suitable for use as a starting material to form molded parts for precision instruments and components for electronic and electric appliances.

EXAMPLES

The following nonlimiting Examples will further illustrate the present invention.

In the following Examples, the properties were determined as follows:

Extrudability

The extrudability was qualitatively evaluated from the shape of the extruded strands, and the bulk specific gravity and water content of the formed pellets.

Half life of static charge

Test pieces ($70 \times 50 \times 3$ mm) were left to stand at a temperature of 23° C. and a relative humidity of 50 % for two days, and then the static charge half life was determined with a Static Honestometer (trade name) at 6 KV for 1 min.

Tensile strength retention

The temperature of the cylinder of the molding machine was adjusted to 260° C. and the resin was allowed to remain at the tip of the screw for 30 min. Then the resin was molded into test pieces and the tensile strength of such test pieces was determined. The retention was determined by a comparison with the tensile strength (100) of test pieces produced without allowing the resin to remain at the tip of the screw.

Examples 1 to 10 and Comparative Examples 1 to 6

Polybutylene terephthalate resin (trade name: Duranex; a product of Polyplastics Co., Ltd.) as the component (A) was mixed with a sulfonate-type anionic antistatic agent (component B) selected from sodium alkylsulfonates (the alkyl group having chiefly 12 carbon atoms) and sodium alkylbenzenesulfonates (the alkyl group having chiefly 12 carbon atoms), triphenyl phosphite or ethylenediaminetetraacetic acid as the component (C) and, if necessary, additives such as a flame retardant, antimony trioxide and glass fibers as shown in Tables 1 and 2 with a ribbon blender. The mixture was molten, kneaded and pelletized in a 30 mm double-screw extruder to evaluate the extrudability of the resin. Then the pellets were molded into test pieces with an injection molding machine and the half life of static charge and the tensile strength retention of the test pieces were determined.

For comparison, similar samples were produced without using triphenyl phosphite or ethylenediaminetetraacetic acid and the properties of them were examined.

The results are shown in Tables 1 and 2.

TABLE 1

| Component/property | Unit | Ex. 1 | Ex. 2 | Ex. 3 | Comp. Ex. 1 | Comp. Ex. 2 |
|---|---|---|---|---|---|---|
| Component | | | | | | |
| Polybutylene terephthalate | wt % | 97.7 | 97.7 | 97.8 | 98.0 | 98.0 |
| Sodium alkylsulfonate | " | 2.0 | — | 2.0 | 2.0 | — |
| Sodium alkyl-aromatic sulfonate | " | — | 2.0 | — | — | 2.0 |
| Triphenyl phosphite | " | 0.3 | 0.3 | — | — | — |
| Ethylenediaminetetraacetic acid | " | — | — | 0.2 | — | — |
| Property | | | | | | |
| Extrudability | | good | good | good | bubbling | bubbling |
| Half-life of static charge | sec | 1 | 5 | 1 | 1 | 5 |
| Tensile strength retention | % | 88 | 82 | 87 | 73 | 57 |

TABLE 2

| Component/property | Unit | Ex. 4 | Ex. 5 | Ex. 6 | Ex. 7 | Comp. Ex. 3 | Comp. Ex. 4 | Ex. 8 | Ex. 9 | Ex. 10 | Comp. Ex. 5 | Comp. Ex. 6 |
|---|---|---|---|---|---|---|---|---|---|---|---|---|
| Polybutylene terephthalate | wt % | 66.75 | 66.75 | 66.9 | 66.9 | 67.0 | 67.0 | 64.5 | 64.2 | 64.7 | 65.0 | 65.0 |
| Sodium alkylsulfonate | " | 1.0 | — | 1.0 | 1.0 | 1.0 | — | 3.0 | — | 3.0 | 3.0 | — |
| Sodium alkyl-aromatic sulfonate | " | — | 1.0 | — | — | — | 1.0 | — | 3.0 | — | — | 3.0 |
| Triphenyl phosphite | " | 0.25 | 0.25 | 0.1 | — | — | — | 0.5 | 0.8 | — | — | — |
| Ethylenediaminetetraacetic acid | " | — | — | — | 0.1 | — | — | — | — | 0.3 | — | — |
| Flame retardant | " | 7.0 | 7.0 | 7.0 | 7.0 | 7.0 | 7.0 | 7.0 | 7.0 | 7.0 | 7.0 | 7.0 |
| Antimony trioxide | " | 5.0 | 5.0 | 5.0 | 5.0 | 5.0 | 5.0 | 5.0 | 5.0 | 5.0 | 5.0 | 5.0 |
| Glass fibers | " | 20.0 | 20.0 | 20.0 | 20.0 | 20.0 | 20.0 | 20.0 | 20.0 | 20.0 | 20.0 | 20.0 |
| Extrudability | | good | good | good | good | bubbling | bubbling | good | good | good | bubbling | vigorous bubbling |
| Half-life of static charge | sec | 5 | 60 | 5 | 5 | 5 | 70 | | 5 | | | 5 |
| Tensile strength retention | % | 95 | 88 | 93 | 95 | 80 | 70 | 92 | 86 | 96 | 76 | 54 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An antistatic thermoplastic polyester resin composition comprising:
   (A) a thermoplastic polyester base resin which is normally susceptible to degradation by sulfonate-type antistatic agents;
   (B) an antistatic effective amount of between about 0.02 to about 10 wt.%, based on the total weight of the composition, of a sulfonate-type anionic antistatic agent which is selected from (i) alkali metal or alkaline earth metal aliphatic sulfonates in which the alkyl group has 1 to 35 carbon atoms, (ii) alkali metal or alkaline earth metal salts of sulfonic acids comprising 1 to 3 aromatic nuclei substituted with an alkyl group having 1 to 35 carbon atoms or (iii) metal alkyl-aromatic sulfonates; and
   (C) an amount effective to stabilize said thermoplastic polyester base resin against degradation by said sulfonate-type antistatic agent which is between about 0.005 to about 10 wt.%, based on the total weight of the composition, of one or more compounds selected from ($C_1$) organophosphorus compounds selected from triphenyl phosphite, tridecyl phosphite, diphenyl mono (2-ethylhexyl) phosphite, diphenyl isodecyl phosphite, phenyl diisodecyl phosphite and tris (nonylphenyl) phosphite and ($C_2$) organic chelating agents selected from ethylenediaminetetraacetic acid, cyclohexane- and diaminetetraacetic acid, ethylenediaminediacetic acid, nitrilotriacetic acid, hydroxyethylenediaminetriacetic acid, diethylenetriaminepentaacetic acid, triethylenetetramine-hexaccetic acid, hydroxyethyliminodiacetic acid, dihydroxyethylglycine, gluconic acid, tartaric acid and citric acid.

2. A thermoplastic polyester resin composition according to any of claim 1, wherein the thermoplastic polyester resin is mainly a polybutylene terephthalate resin.

3. A thermoplastic polyester resin composition according to claim 1, which further contains a flame retardant and/or an inorganic filler.

4. A thermoplastic polyester resin composition according to claim 1, which further contains a polyolefin wax.

5. A thermoplastic polyester resin composition according to claim 1, wherein a weight ratio of component (C) to component (B) ranges between 3/100 to 100/100.

6. A molded article exhibiting antistatic properties which consists essentially of the thermoplastic polyester resin composition as recited in claim 1.

* * * * *

UNITED STATES PATENT AND TRADEMARK OFFICE
CERTIFICATE OF CORRECTION

PATENT NO. : 5,045,580

DATED : September 3, 1991

INVENTOR(S) : KITAMURA

It is certified that error appears in the above-identified patent and that said Letters Patent is hereby corrected as shown below:

Column 2, line 12, after "Further" insert --,--;
          line 17, after "compounds" delete "included" and insert --include--;

Column 3, line 7, after "metals" delete "includes" and insert --include--.

Column 6, line 21, delete "Part" and insert --A part--;
          line 22, before "mixed" delete "are" and insert --is--;
          line 23, before "part" insert --a--;
          line 24, after "components" delete "are" and insert --is--;
          line 33, after "those" delete "free from".

Signed and Sealed this

Twelfth Day of January, 1993

Attest:

DOUGLAS B. COMER

*Attesting Officer*      *Acting Commissioner of Patents and Trademarks*